United States Patent [19]

Andrews

[11] 4,009,064
[45] Feb. 22, 1977

[54] METHOD OF FORMING LAMINATED CURVILINEAR GLASS SHEET

[75] Inventor: Wendell C. Andrews, Mesa, Ariz.

[73] Assignee: Corning Glass Works, Corning, N.Y.

[22] Filed: Feb. 20, 1976

[21] Appl. No.: 659,697

[52] U.S. Cl. .............................. 156/102; 65/107; 65/374 R; 156/245; 264/220

[51] Int. Cl.² .................. B32B 17/00; C03B 11/00

[58] Field of Search ............ 156/99, 102, 242, 245; 65/106, 107, 374 R, 18, 47, 287, 305, 357, 102, 54, 55, 288, 286, 273, 275; 428/409, 410, 426, 437; 264/220, 219, 222, 225, 227; 106/38.9

[56] References Cited

UNITED STATES PATENTS

| | | | |
|---|---|---|---|
| 3,208,839 | 9/1965 | Nordberg | 65/106 |
| 3,367,764 | 2/1968 | Seymour | 65/273 |
| 3,508,903 | 4/1970 | Seymour | 65/273 |
| 3,582,371 | 1/1972 | Bruno et al. | 65/33 |
| 3,634,059 | 1/1972 | Miller | 65/287 |
| 3,681,043 | 8/1972 | Bognar | 65/287 |
| 3,728,097 | 4/1973 | Bognar | 65/102 |
| 3,833,385 | 9/1974 | Adelsberg et al. | 106/38.9 |
| 3,904,460 | 9/1975 | Comperatone | 156/102 |

Primary Examiner—Charles E. Van Horn
Assistant Examiner—Michael W. Ball
Attorney, Agent, or Firm—Burton R. Turner; Clarence R. Patty, Jr.

[57] ABSTRACT

A plurality of inner and outer shell molds having virtually identical surface contours are formed from a single master mold such that glass outer layers sagged to the contour of said outer shell molds may be laminated with any glass inner layer sag-formed on said inner shell molds.

7 Claims, 16 Drawing Figures

METHOD OF FORMING LAMINATED CURVILINEAR GLASS SHEET

BACKGROUND OF THE INVENTION

The present day method of forming laminated curvilinear glass sheets, such as automotive windshields, is dependent upon the simultaneous formation of a pair of matched layers which are subsequently laminated together into a composite laminated curvilinear glass sheet. Not only are the layers simultaneously sagged together by means of a peripheral mold, but also the composition of the various layers must be virtually identical so as to obtain uniform sagging characteristics.

In view of the fact that the peripheral molds utilized in the simultaneous sagging of the two layers only provide for uniform edge contours which remain consistent with the consecutive sagging of various layers, the freely sagged central portion may vary between supposedly identical sagging cycles due to inherent thermal discontinuities within the heat-sagging cycle and variations in mold movement. Thus, although the simultaneously sagged layers, being subjected to identical thermal conditions, will sag into a complementary relation so as to facilitate subsequent lamination into a composite laminate, due to the variations in thermal application between individual cycles, it is virtually impossible to effectively laminate a layer from one free sagging cycle with the layer from another such cycle due to discontinuities in the resulting freely-sagged proportions of such layers. Accordingly, after a pair of layers have been simultaneously sagged by means of a peripheral mold, such layers must be maintained as "partners" until such time as they are subsequently "married" into a composite laminate. Should one such layer of a simultaneously free-sagged pair of layers become damaged or broken, its partner must be discarded or destroyed since it has no further useful purpose in a laminate.

A further limitation encountered with the presently utilized process of free-sagging a pair of glass layers by means of a peripheral mold, lies in the fact that the glass composition of each layer must be substantially identical in order to obtain sagging uniformity in the freely sagged portion. That is, if two layers of glass having different compositions were simultaneously sagged by means of a peripheral mold, the composition having the higher softening point would sag at a much slower rate than the sheet composition having a lower softening point, and accordingly the free-sagging cycle would not produce a matched pair of sheets which could be laminated into a composite laminate.

Accordingly, the present invention has overcome the problems encountered with present day sagging operations by utilizing substantially identical inner and outer shell molds for sagging inner and outer layers of a laminate which may be of various compositions, and which permit the random lamination of such sagged outer layers with such sagged inner layers to form a composite curvilinear glass laminate.

SUMMARY OF THE INVENTION

The present invention sets forth a novel method of making curvilinear laminated glass articles in such a manner so that a randomly selected inner layer, preformed to the desired contour, may be laminated with a randomly selected outer layer, also preformed to the desired contour. To accomplish this end, a master mold having the desired surface contour is first formed, and a plurality of inner and outer shell sagging molds are sag-formed on the master mold so as to incorporate the identical contour of the master mold. In order that the inner surface of the laminate layer sagged upon the outer shell mold will conform to the outer surface of the laminate layer sagged on the inner shell mold, the outer shell mold is preferably formed with a thickness equivalent to the thickness of the inner shell mold, plus the thickness of the inner layer of the laminate, plus the thickness of the laminating material to be interposed therebetween. Accordingly, the outer surface of the sagged inner layer corresponds to the inner surface of the sagged outer layer with compensation being made for the thickness of the laminating plastic material, so that the composite laminate produced therefrom is of a unitary structure formed with complementary layers.

It thus has been an object of the present invention to overcome the problems involved in the free-sagging of mated layers and the problems involved in surface discontinuities in supported sagging, by providing a novel method of individually forming a plurality of inner and outer contoured layers upon contoured mold surfaces, and subsequently randomly laminating such complementary inner and outer layers into a composite laminate.

BRIEF DESCRIPTION OF THE DRAWINGS

FIG. 1 illustrates a pattern having a desired surface contour.

FIG. 2 illustrates the formation of a female plaster cast formed from the pattern of FIG. 1.

FIG. 3 illustrates the formation of a master mold from the female plaster cast.

FIG. 4 illustrates a sheet of green glass-ceramic material which has been ground and finished to the desired thickness.

FIG. 5 illustrates the positioning of the glass-ceramic sheet of FIG. 4 upon the master mold formed in the process of FIG. 3.

FIG. 6 illustrates the inner shell mold as it is sag-formed upon the master mold.

FIG. 7 illustrates the rigidified inner shell sagging mold.

FIG. 8 illustrates a sheet of green glass-ceramic material ground to a thickness equivalent to the sheet shown in FIG. 4 from which the shell mold of FIG. 7 is formed, plus the thickness of the inner glass layer to be formed, and the thickness of the plastic laminating material to be utilized in the ultimate laminate.

FIG. 9 illustrates the positionment of the glass-ceramic sheet of FIG. 8 upon the same master mold shown in FIG. 5 used to form the inner shell mold.

FIG. 10 illustrates the sag-formation of the glass-ceramic sheet shown in FIG. 8 into an outer shell mold upon the master mold.

FIG. 11 illustrates the rigidified outer shell mold having the same surface contour as the contour of the master mold.

FIG. 12 illustrates the positionment of the outer layer of the laminate upon the outer shell mold.

FIG. 13 illustrates the positionment of the inner layer of the laminate upon the inner shell mold.

FIG. 14 is an exploded schematic view illustrating the inner and outer layers contoured to the surface contours of the inner and outer shell molds with a laminating plastic positioned therebetween.

FIG. 15 illustrates the composite laminate formed from the layers shown in FIG. 14 which have been laminated together in a conventional manner.

DESCRIPTION OF THE PREFERRED EMBODIMENTS

Figure 1:
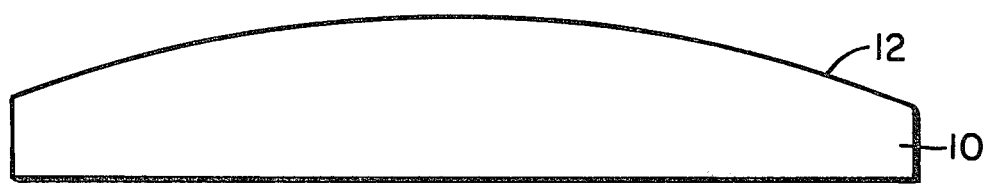
FIGS. 1–15 schematically illustrate the method of forming a curvilinear composite glass laminate in accordance with the present invention.
Figure 2:
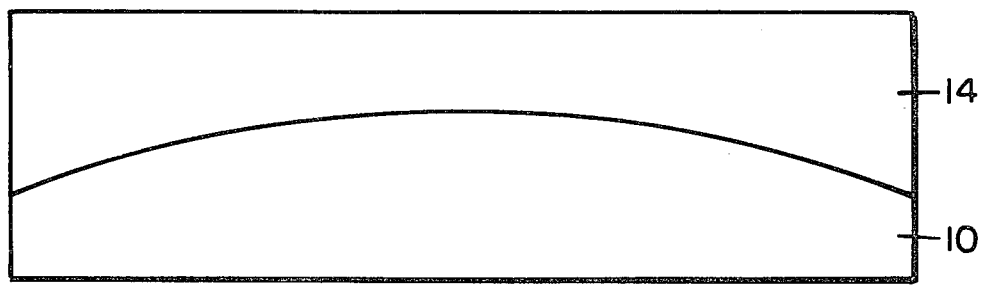
Figure 3:
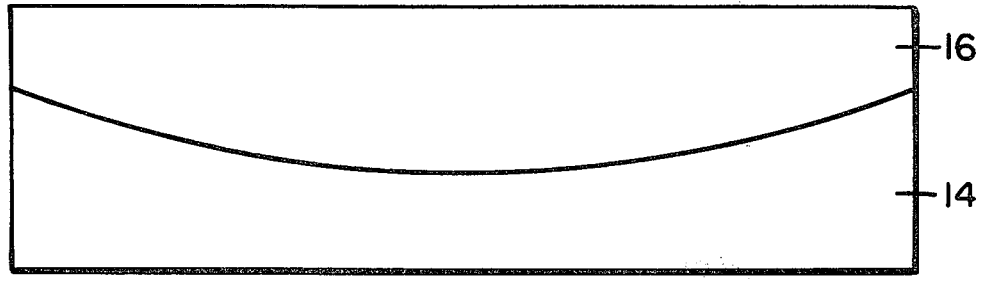
Figure 4:

In forming the master mold, a pattern 10 is first made from any suitable rigid material such as laminated wood and/or reinforced plastic. The surface 12 of the pattern is made to exactly represent the inside surface contour of the desired article, such as a windshield, less the thickness of the inner shell mold. In the case of a plano-curvilinear windshield, the patterned surface may be made by generating a plano-curved surface which will fit a jig representing the edges of the windshield, and with a straight line surface running from the top to the bottom of the windshield as it would be installed in an automobile. Preferably the pattern 10 is extended approximately two inches beyond the actual size of the glass required so as to allow the shell mold to be made larger than the glass pieces to be sagged. The pattern, which has been compensated for the size of the inner shell mold, is provided with walls about its periphery to form an open top cavity having the contoured pattern as its bottom surface. The cavity is filled with a casting plaster to produce a female mold or plaster cast 14 having a surface complementing that of the compensated pattern 10 (see FIG. 2). Walls are then provided about the female mold 14 to form another open top cavity with the surface of the plaster cast female mold forming the bottom thereof. The cavity is then partially filled with any suitable easily castable but durable and stable material such as castable petalite or alumina materials. A plastic form or "floater" (not shown) may be pressed downwardly into the castable material to create a hollowed out section for producing a master mold having a somewhat uniform thickness. The thus formed mold 16 (see FIG. 3) is dried and fired to become the master mold.

A sheet of glassy material 20 which is crystallizable into crystalline glass-ceramic material is ground to a desired thickness and surface flatness while in its "green" glass-ceramic state and before being crystallized into a glass-ceramic material. The sheet or shell mold blank 20 is cut from a sheet of green glass-ceramic material with a predetermined size which is larger than the size of the glass article to be sagged thereon, but not larger than the master mold 16 upon which the shell mold is formed. While in its flat state, the blank 20 is ground on both sides to a desired thickness and smooth surface finish, and the edges are ground with an edging wheel which gives a rounded edge with a nominal radius.

Figure 5:
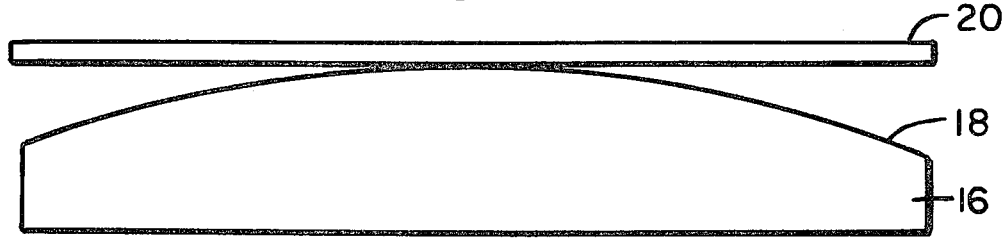
Figure 6:
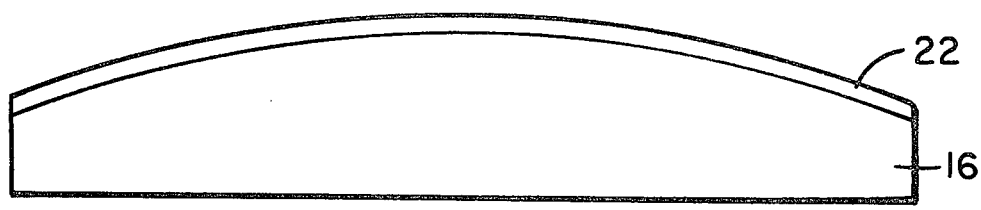
Figure 7:
Figure 8:
Figure 9:
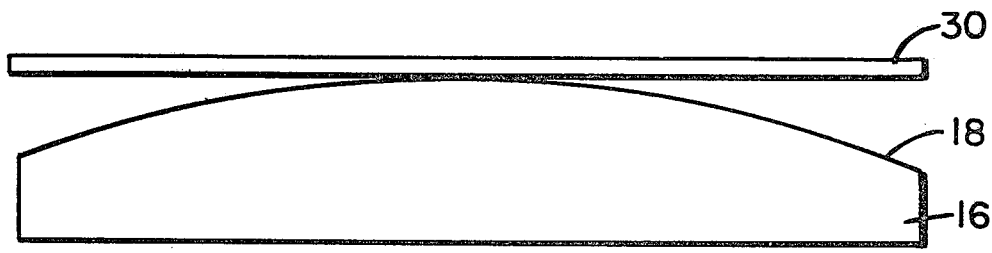

The ground blank of green glass-ceramic material 20 is then placed upon the master mold 16 having a desired predetermined contoured surface 18 as shown in FIG. 5. The master mold and the green glass-ceramic sheet are positioned within a kiln and fired so as to sag the sheet into conformity with the predetermined contour 18 of the master mold, as shown at FIG. 6, and to ceram (i.e. transfer the material from a predominantly glassy state into a predominantly crystalline state through heat treatment) the sagged sheet into a crystalline glass-ceramic inner shell mold 22 having a surface contour 24 virtually identical with that of the master mold 16. The resulting ceramed and rigidified glass-ceramic shell or sagging mold 22 is shown in FIG. 7. As will be readily apparent, a plurality of inner shell molds or sagging molds 22 having identical contoured surfaces 24 may be formed from a single master mold 16 merely by repeating the sagging and ceramming cycle with consecutively presented shell mold blanks 20.

Figure 10:
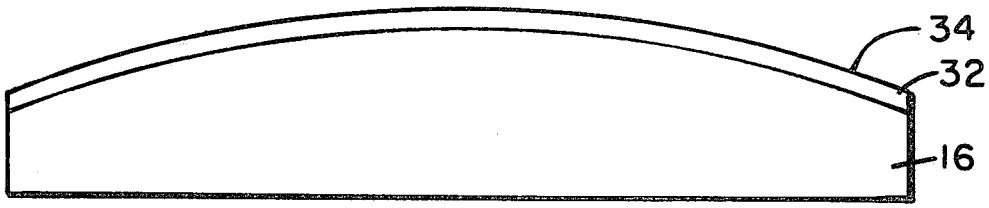
Figure 11:

As shown in FIGS. 8–11, the same process is repeated with respect to the formation of the outer shell or sagging mold, with the exception that the sheet or blank of green glass-ceramic material 30, from which the outer shell mold is to be formed, is provided with a thickness equal to the thickness of the inner shell mold, plus the thickness of the inner glass layer to be sagged on the inner shell mold, plus the thickness of the laminating material to be used in the ultimate composite laminate. Accordingly, the shell mold blank or sheet of green glass-ceramic material 30, which has been ground and finished to a thickness which compensates for the thickness of the inner glass layer and laminating material, is positioned upon the master mold 16 having the desired contoured surface 18. The master mold 16 and the green glass-ceramic sheet 30 are positioned within a suitable kiln and subjected to a heat treatment cycle such that the shell mold blank 30, while in its green state, is sagged to conform to the contour of surface 18, and then is ceramed into a rigid glass-ceramic outer shell or sagging mold 32, as shown in FIGS. 10 and 11. The surface 34 of the outer shell mold 32 conforms to the prescribed contour of surface 18 of master mold 16, compensated only by the prescribed thickness of the outer shell mold 32. As with the inner shell mold, a plurality of outer shell molds 32 having identical contoured surfaces 34 may be formed from a single master mold 16 by repeating the sagging and ceraming cycle with consecutively presented shell mold blanks 30 of prescribed thickness.

When sagging and ceraming the green glass-ceramic blanks 20 and 30, it is necessary to control the temperature cycle so that the sagging of the sheet to the conformity of the surface 18 of the master mold 16 is completed before sufficient nucleation and crystallization takes place which result in the rigidification of the sheet. In other words, the ceraming temperature cycle is so controlled such that the temperature of the master mold and the blank is elevated at a fairly rapid rate to effect sagging of the blank to the contour of the master mold prior to excessive nucleation. The cycle temperature is then elevated to effect further nucleation and crystallization so as to form a rigid crystalline structure which is then cooled at a controlled rate to room temperature. Although various glass-ceramic compositions may be utilized to form the inner and outer shell molds, it is necessary for operability of the mold that it be thermally stable, highly refractory, and have a relatively low coefficient of thermal expansion so that it will remain dimensionally stable during the heat up and cool down of repeated sagging cycles. Preferred compositions are disclosed in Table I of U.S. Pat. No. 3,582,371, and a representative cycle for sagging and ceraming such material is to initially raise the temperature at a rate of about 300° C/hr. to between about 750° and 800° C., and hold at such temperature for about 2 hours, and then raise the temperature to about 1125°

C. and hold for 2 hours, and finally cool to room temperature with a hold of about 5 hours at 600° C.

Figure 12:
Figure 13:
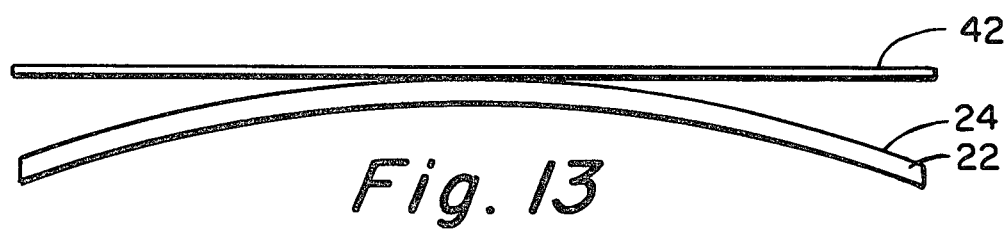

Referring now to FIGS. 12 and 13, an outer layer 40 of the composite laminate is positioned upon the outer shell mold 32 and heated so as to sag and conform to the contour of the surface 34, whereas the inner layer 42 of the composite laminate is positioned upon inner shell mold 22 and heated so as to sag and conform to the contour of the surface 24. In view of the fact that the outer and inner layers 40, 42 of the composite laminate may be of different glass compositions and different thicknesses, each may require its own sagging cycle in order to obtain the required complementary contoured surfaces 44, 46 respectively, necessary to form a mating composite laminate 50. Although the particular sagging cycle will vary with the thickness and composition of the glass utilized, as well as the desired contour to be obtained, a specific example is set forth representative of cycles which could be utilized when sagging inner and outer layers of a windshield wherein the outer layer is made of a soda lime glass such as set forth in Table 1-1 of page 4 of Glass Engineering Handbook, Second Edition by E. B. Shand, and the inner layer is of a chemically strengthenable glass composition such as disclosed in U.S. Pat. No. 3,752,729. Whereas soda lime glass may have an annealing point of between about 510° and 550° C. and a softening point of between about 700° and 735° C., the chemically strengthened glass composition of said U.S. Pat. No. 3,752,729 may have an annealing point of around 625° C. and a softening point of about 870° C. Inasmuch as the most effective sagging temperatures appear to be those between the annealing and softening points of the glass composition utilized, the sagging temperatures employed for the inner and outer glass layers of the representative windshield reflect the annealing point and softening point differences in such glasses. With reference to the cycle for the outer soda lime glass composition, the temperature is advanced to 100° C. and held for about 30 minutes and then advanced to about 500° C. and held for 30 minutes, and finally advanced to about 610° C. and held for 25 minutes, and then allowed to cool. With respect to the inner chemically strengthenable composition, the sheet is initially advanced to 100° C. and held for 30 minutes, and then advanced to 600° C. and held for 30 minutes, and finally advanced to 710° C. and held for 25 minutes, and then allowed to cool.

Figure 14:
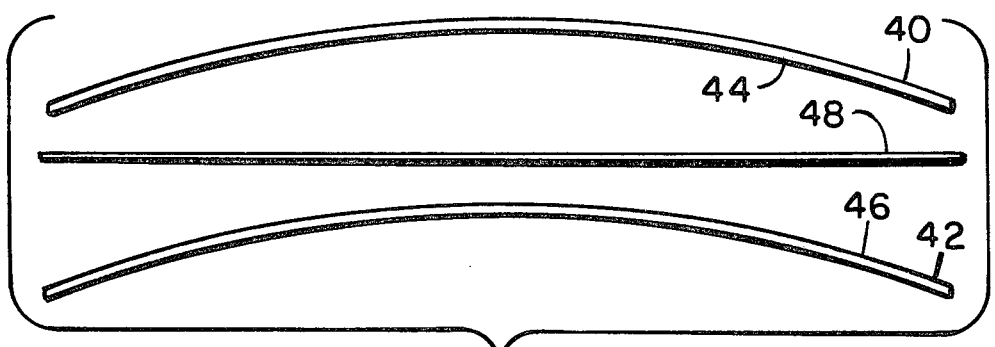
Figure 15:

After the outer layer 40 and inner layer 42 have been sagged to the desired contour on the outer and inner shell molds respectively, the layers are provided with a laminating plastic sheet 48 as shown in FIG. 14 and, through conventional laminating techniques known in the industry, the layers are laminated into a mating composite laminate 50 as shown in FIG. 15.

Figure 16:
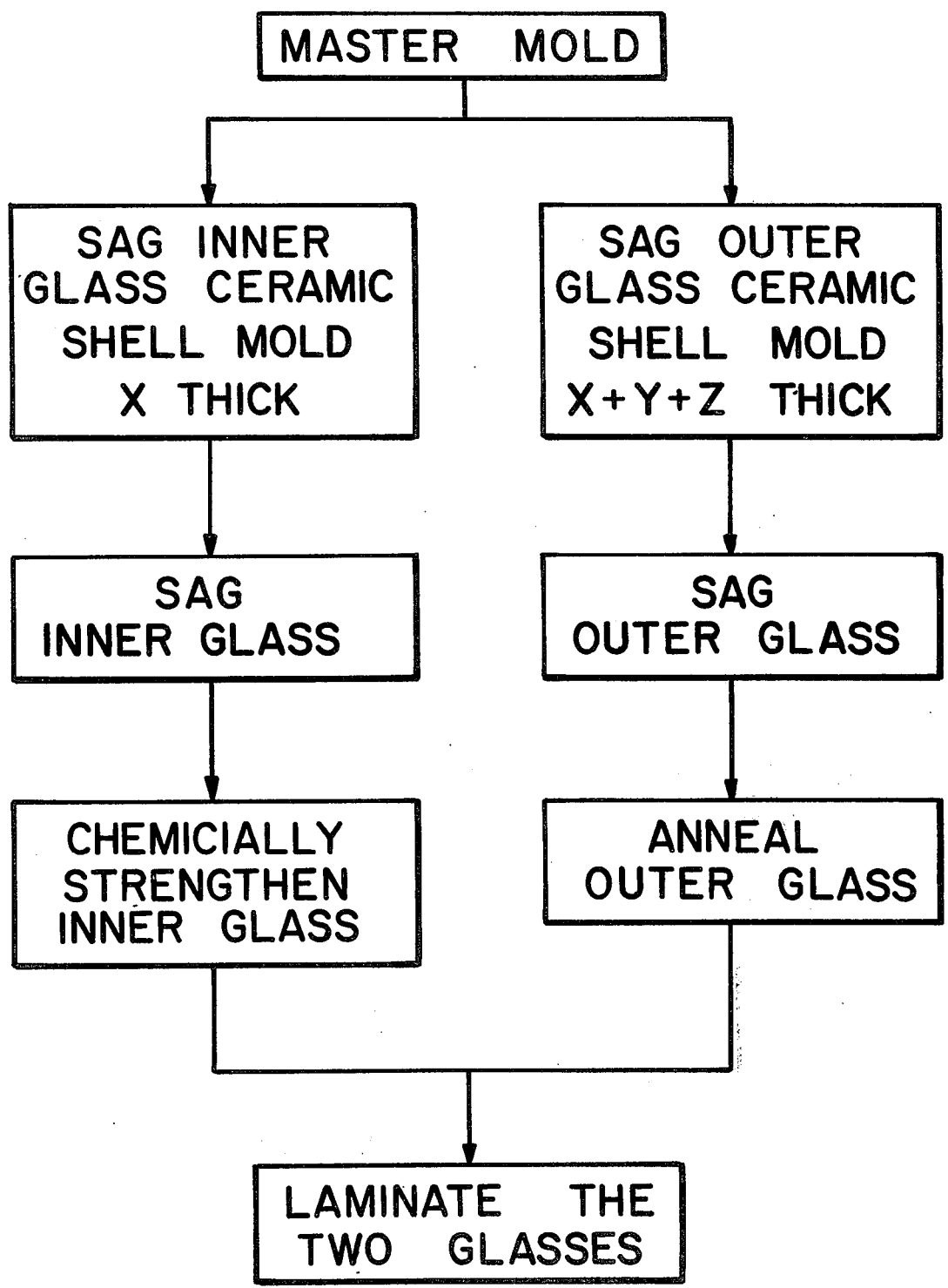
FIG. 16 sets forth a flow diagram for forming the laminated curvilinear glass sheets of the present invention.

The disclosed invention is summarized in the flow diagram of FIG. 16 and sets forth a process which permits the formation of sheets of glass, which may be of different compositions, to specific shapes and contours. A specific advantage which can be obtained with such process is the fact that the sheets of glass may be formed at separate times and in separate process cycles, and yet have contours which are virtually identical so that any two inner and outer sagged layers may be laminated together to form an optically acceptable composite laminate for automotive windshields. As shown in FIG. 16, both inner and outer glass-ceramic shell molds are sag-formed from a master mold. The inner glass-ceramic shell mold is made with a predetermined thickness X, whereas the outer glass-ceramic shell mold is made of a thickness equivalent to X + Y + Z, wherein X is the thickness of the inner shell mold which may be about ¼ inches, Y is the thickness of the inner glass layer of the laminate which may be about 0.07 inches, and Z is the thickness of the laminating plastic which forms the composite laminate which may be about 0.03 inches. As further shown in the flow diagram, both the inner and outer layers of the laminate are sagged upon the inner and outer shell molds respectively. When the inner layer is of a chemically strengthenable glass, the glass is then chemically strengthened, whereas when the outer layer is made of a soda lime glass, such glass is annealed. The two layers are then laminated together in a conventional manner with a laminating plastic sheet to form the composite laminate.

Although the now preferred embodiments of the invention have been disclosed, it will be apparent to those skilled in the art that various changes and modifications may be made thereto without departing from the spirit and scope thereof as defined in the appended claims.

I claim:

1. A method of forming a laminated curvilinear article from glass sheet which comprises, forming a master mold having a surface contour representing the desired contour of the laminated curvilinear article to be formed, sag-forming an inner shell mold of a first predetermined thickness on said master mold with a surface contour virtually identical to that of the master mold, sag-forming an outer shell mold of a second predetermined thickness on said master mold with a surface contour virtually identical to that of said master mold, positioning a first sheet of glass on said inner shell mold and sagging said sheet to conform to the surface contour of said inner shell mold, positioning a second sheet of glass on said outer shell mold and sag-forming said sheet to the surface contour of said outer shell mold, interposing laminating material between said sagged inner and outer layers, and laminating said layers together into a curvilinear composite laminate.

2. A method of forming a laminated curvilinear article from glass sheet as defined in claim 1 including the steps of casting said master mold from a preformed pattern and forming said inner and outer shell molds from a glass-ceramic material while said material is still in a glassy state, and then crystallizing said material into a rigidified glass-ceramic state after said shell molds have obtained their desired surface contours.

3. A method of forming a laminated curvilinear article from glass sheet as defined in claim 1 including, forming said outer shell mold with a second predetermined thickness equal to the first predetermined thickness of said inner shell mold, plus the thickness of said inner layer, plus the thickness of said laminating material, so as to form mating inner and outer layers.

4. A method of forming a laminated curvilinear article from glass sheet as defined in claim 1 wherein said first sheet of glass is of one composition, and said second sheet of glass is of a different composition, and each sheet is sagged at a temperature between its annealing point and softening point to form the inner and outer layers of said composite laminate.

5. A method of forming a laminated curvilinear article from glass sheet as defined in claim 1 including the steps of chemically strengthening at least one of said sagged layers.

6. A method of forming a laminated curvilinear article from glass sheet as defined in claim 1 including the step of annealing at least one of said sheets of glass after it has been sag-formed on a shell mold into a layer for said composite laminate, but before being laminated into said composite.

7. A method of forming a laminated curvilinear article from glass sheet as defined in claim 1 wherein said inner and outer layers are laminated together to form a plano-curvilinear automotive windshield.

* * * * *